(12) United States Patent
Shih

(10) Patent No.: US 11,465,194 B2
(45) Date of Patent: Oct. 11, 2022

(54) COMBINATIONAL HEATSINK TUBE FOR INTERCOOLER

(71) Applicant: Ping-Tsang Shih, Puyan Township, Changhua County (TW)

(72) Inventor: Ping-Tsang Shih, Puyan Township, Changhua County (TW)

( * ) Notice: Subject to any disclaimer, the term of this patent is extended or adjusted under 35 U.S.C. 154(b) by 0 days.

(21) Appl. No.: 17/036,232

(22) Filed: Sep. 29, 2020

(65) Prior Publication Data

US 2022/0097122 A1    Mar. 31, 2022

(51) Int. Cl.
| | |
|---|---|
| *B21D 53/08* | (2006.01) |
| *B21D 39/03* | (2006.01) |
| *B21D 51/04* | (2006.01) |
| B21D 53/02 | (2006.01) |
| B23P 15/26 | (2006.01) |

(52) U.S. Cl.
CPC .......... *B21D 53/08* (2013.01); *B21D 39/031* (2013.01); *B21D 51/04* (2013.01); *B21D 53/02* (2013.01); *B23P 15/26* (2013.01); *B23P 2700/09* (2013.01); *B23P 2700/11* (2013.01); *Y10T 29/4935* (2015.01); *Y10T 29/49378* (2015.01); *Y10T 29/49391* (2015.01); *Y10T 29/49393* (2015.01)

(58) Field of Classification Search
CPC ... B23P 15/26; B23P 2700/11; B23P 2700/09; B21D 53/02; B21D 53/04; B21D 53/08; B21D 39/031; B21D 51/04; Y10T 29/4935; Y10T 29/49378; Y10T 29/49391; Y10T 29/49393
See application file for complete search history.

(56) References Cited

U.S. PATENT DOCUMENTS

| | | | | |
|---|---|---|---|---|
| 6,119,341 A | * | 9/2000 | Kato ..................... | B21C 37/151 29/890.053 |
| 8,091,621 B2 | * | 1/2012 | Zobel .................... | B21C 37/157 165/177 |
| 8,191,258 B2 | * | 6/2012 | Zobel .................... | B21C 37/157 29/890.053 |
| 8,683,690 B2 | * | 4/2014 | Zobel ..................... | F28F 3/025 29/890.053 |
| 8,726,508 B2 | * | 5/2014 | Zobel .................... | F28D 1/0308 29/890.053 |
| 9,726,439 B2 | * | 8/2017 | Omae ..................... | F28F 3/025 |
| 2006/0032251 A1 | * | 2/2006 | Wakita ................... | B23P 15/26 62/165 |

(Continued)

*Primary Examiner* — Jermie E Cozart
(74) *Attorney, Agent, or Firm* — Alan D. Kamrath; Karin L. Williams; Mayer & Williams PC

(57) ABSTRACT

A method for forming heatsink tube includes cutting a base sheet plate into a first molded frame and a second molded frame, applying a flux on an inner face of the first molded frame and the second molded frame, mounting the first molded frame on a heatsink fin module, and mounting the second molded frame on the first molded frame, to assemble the first molded frame, the heatsink fin module, and the second molded frame, and to form a heatsink tube. The first molded frame has a first end faceplate and two first connecting portions. The second molded frame has a second end faceplate and two second connecting portions. Each of the two first connecting portions is formed with a first abutting section, and each of the two second connecting portions is formed with a second abutting section.

14 Claims, 8 Drawing Sheets

(56) References Cited

U.S. PATENT DOCUMENTS

| | | | |
|---|---|---|---|
| 2006/0086491 A1* | 4/2006 | Ueda | F28F 3/025 |
| | | | 165/177 |
| 2007/0124934 A1* | 6/2007 | Peng | H01L 23/473 |
| | | | 29/890.03 |
| 2009/0019689 A1* | 1/2009 | Zobel | B21C 37/158 |
| | | | 29/727 |
| 2009/0019695 A1* | 1/2009 | Zobel | B21C 37/14 |
| | | | 29/890.053 |
| 2009/0139088 A1* | 6/2009 | Lin | B21D 53/02 |
| | | | 29/890.03 |
| 2015/0096728 A1* | 4/2015 | Agner | B21D 13/04 |
| | | | 165/168 |

* cited by examiner

COMBINATIONAL HEATSINK TUBE FOR INTERCOOLER

BACKGROUND OF THE INVENTION

1. Field of the Invention

The present invention relates to an intercooler and, more particularly, to a heatsink tube for an intercooler.

2. Description of the Related Art

A conventional heatsink tube in accordance with the prior art shown in FIGS. 6 and 7 comprises a mounting tube 1 and flexible inner fins (or turbulators) 2. The flux is applied (or sprayed) on the inner fins 2. Then, the inner fins 2 are inserted into the mounting tube 1 to form the heatsink tube. Then, the heatsink tube is mounted in an intercooler by brazing. However, the inner fins 2 are easily deformed due to compression during the assembling process. In addition, the flux increases the friction between the inner fins 2 and the mounting tube 1 so that the heatsink tube is not assembled easily. Further, the inner fins 2 and the mounting tube 1 are not connected closely due to deformation of the inner fins 2 during the brazing process.

Another conventional heatsink tube 10 in accordance with the prior art shown in FIG. 8 comprises a mounting tube 11 and a vertical heatsink piece 12. The mounting tube 11 and the vertical heatsink piece 12 are formed integrally by aluminum extrusion. However, the vertical heatsink piece 12 has a poor heat dissipation effect.

BRIEF SUMMARY OF THE INVENTION

The primary objective of the present invention is to provide a combinational heatsink tube that is assembled easily and conveniently.

In accordance with the present invention, there is provided a method for forming heatsink tube comprising a first step, a second step, and a third step. The first step includes performing a tube folding to initially roll a base sheet plate and then cut the base sheet plate into a first molded frame and a second molded frame. The base sheet plate is made of aluminum. The first molded frame is formed with a first end faceplate and two first connecting portions. The two first connecting portions are formed on two sides of the first end faceplate. Each of the two first connecting portions is formed with a first abutting section. The second molded frame is formed with a second end faceplate and two second connecting portions. The two second connecting portions are formed on two sides of the second end faceplate. Each of the two second connecting portions is formed with a second abutting section. The second abutting section of each of the two second connecting portions corresponds to the first abutting section of each of the two first connecting portions. The second step includes applying a flux on an inner face of the first molded frame and the second molded frame. The third step includes mounting the first molded frame on a heatsink fin module, and mounting the second molded frame on the first molded frame, to assemble the first molded frame, the heatsink fin module, and the second molded frame, and to form a product of a heatsink tube. The heatsink fin module is flexible. The heatsink tube has a flat shape. The first molded frame, the heatsink fin module, and the second molded frame are combined to construct the heatsink tube. The heatsink fin module is sandwiched between the first molded frame and the second molded frame. Each of the two first connecting portions of the first molded frame is mounted on the heatsink fin module. Each of the two second connecting portions of the second molded frame is mounted on each of the two first connecting portions of the first molded frame. The second abutting section of each of the two second connecting portions rests on and presses the first abutting section of each of the two first connecting portions.

According to the primary advantage of the present invention, the heatsink fin module is assembled with the first molded frame and the second molded frame easily and quickly and will not be compressed and deformed, to increase the production quality of the heatsink tube.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
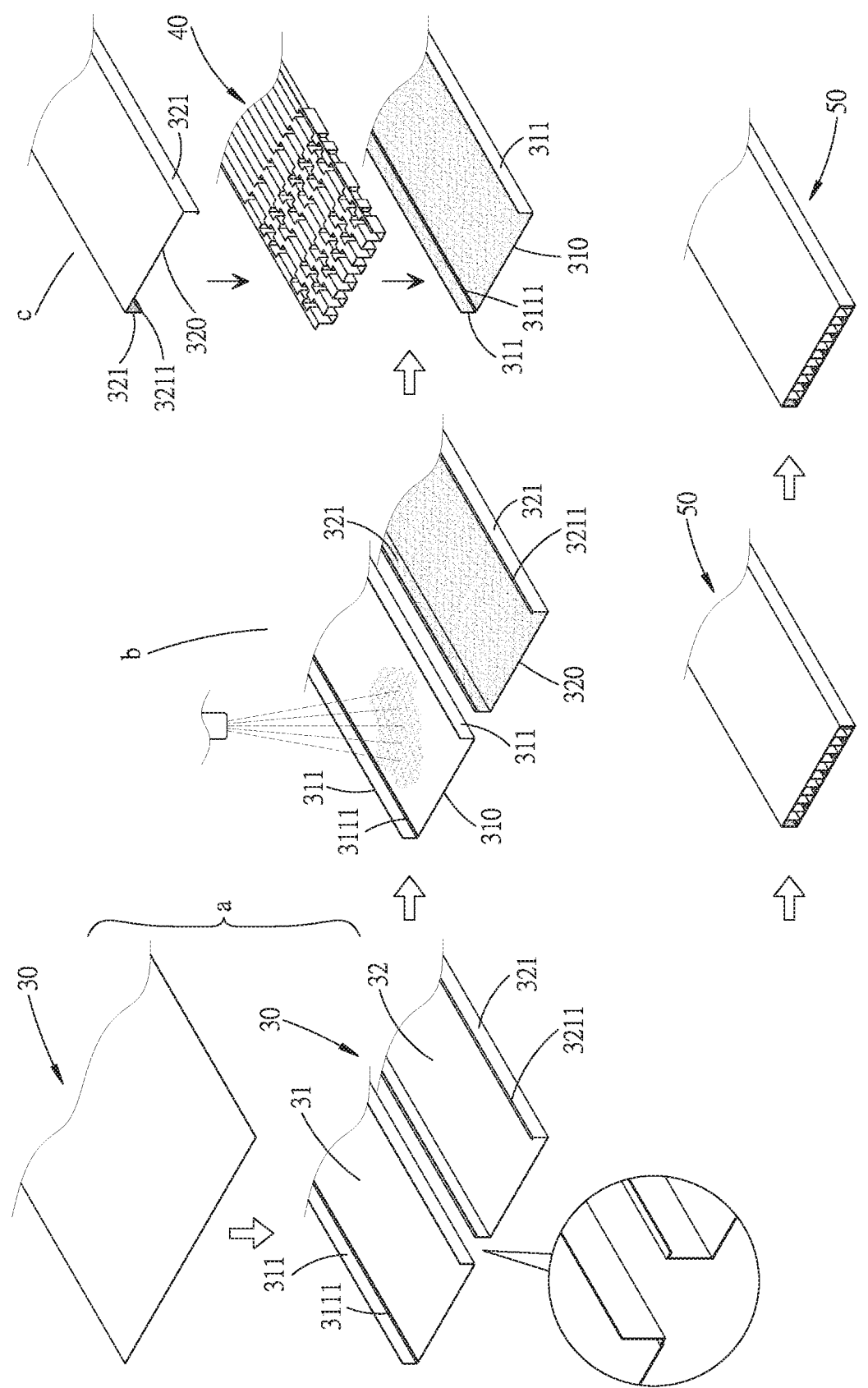
FIG. 1 is a flow chart showing a method for forming a heatsink tube in accordance with the preferred embodiment of the present invention.
Figure 2:
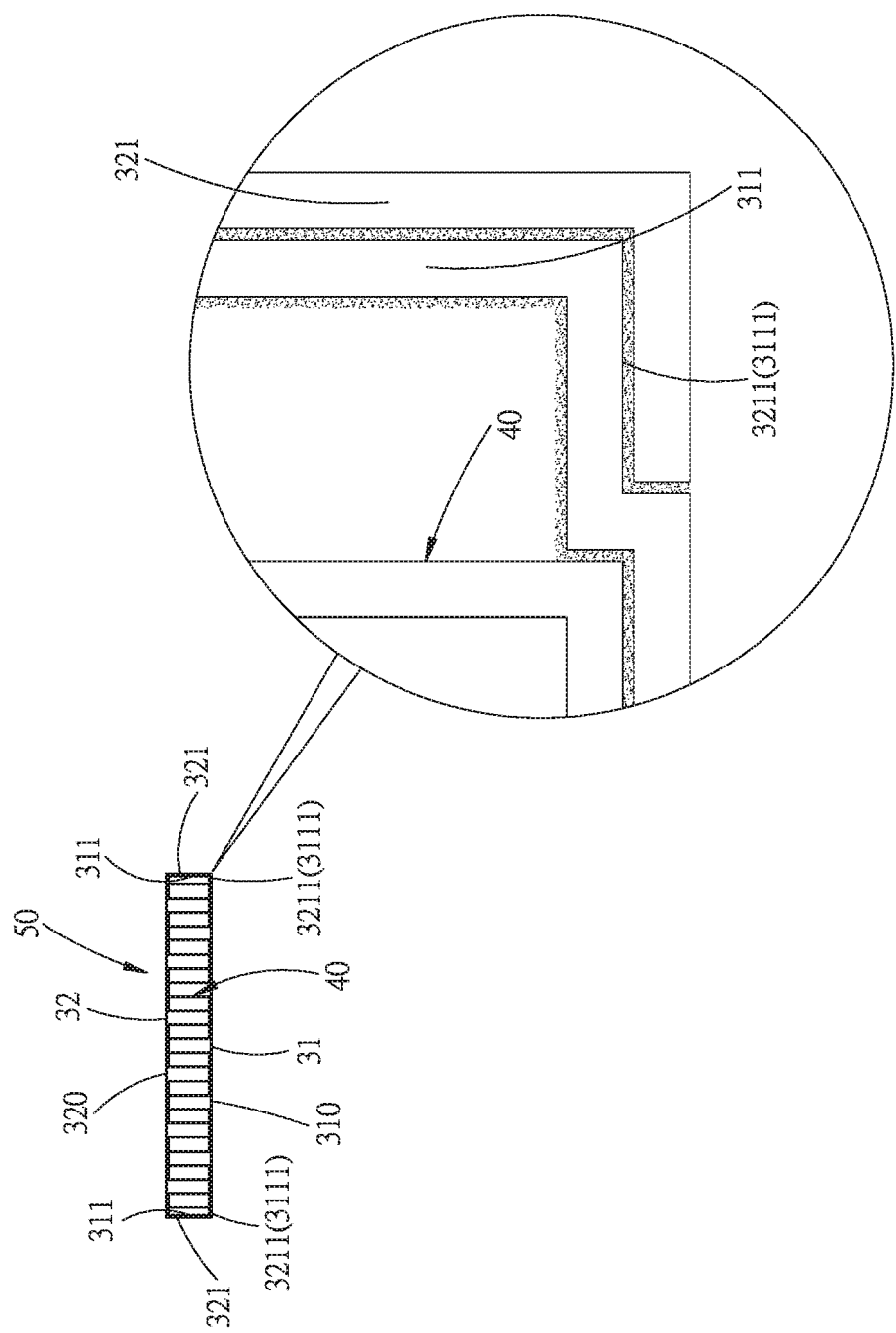
FIG. 2 shows a cross-sectional assembly view and a locally enlarged view of the heatsink tube in accordance with the preferred embodiment of the present invention.
Figure 3:
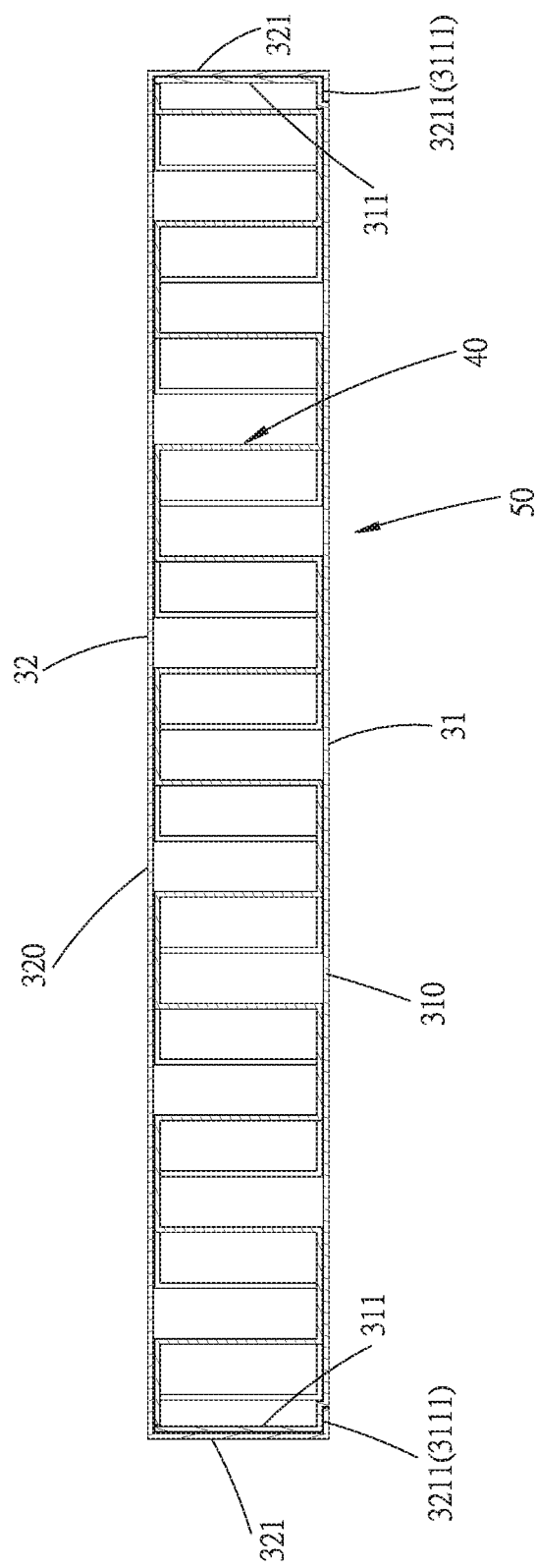
FIG. 3 is a locally enlarged cross-sectional assembly view of the heatsink tube in accordance with the preferred embodiment of the present invention.

Referring to the drawings and initially to FIGS. 1-3, a method for forming a heatsink tube in accordance with the preferred embodiment of the present invention comprises a first step (a), a second step (b), and a third step (c).

The first step (a) includes performing a tube folding to initially roll a base sheet plate 30 and then cut the base sheet plate 30 into a first molded frame 31 and a second molded frame 32. The base sheet plate 30 is made of aluminum. The first molded frame 31 functions as a first positioning (or locking) element. The first molded frame 31 is formed with a first end faceplate (or bottom plate) 310 and two first connecting portions 311. The two first connecting portions 311 are formed on two sides of the first end faceplate 310 by bending. Each of the two first connecting portions 311 is formed with a first abutting (or locking) section 3111 by bending. The second molded frame 32 functions as a second positioning (or locking) element. The second molded frame 32 is formed with a second end faceplate (or bottom plate) 320 and two second connecting portions 321. The two second connecting portions 321 are formed on two sides of the second end faceplate 320 by bending. Each of the two second connecting portions 321 is formed with a second abutting (or locking) section 3211 by bending. The second abutting section 3211 of each of the two second connecting portions 321 corresponds to the first abutting section 3111 of each of the two first connecting portions 311.

The second step (b) includes applying a flux on an inner face of the first molded frame 31 and the second molded frame 32. The flux is applied by spraying or painting and is distributed evenly on the inner face of the first molded frame 31 and the second molded frame 32.

The third step (c) includes mounting the first molded frame 31 on a heatsink fin module 40, and mounting the second molded frame 32 on the first molded frame 31, to assemble the first molded frame 31, the heatsink fin module 40, and the second molded frame 32, and to form a product of a heatsink tube 50. The heatsink fin module 40 is flexible. The heatsink tube 50 has a flat shape. The first molded frame 31, the heatsink fin module 40, and the second molded frame 32 are combined to construct the heatsink tube 50. The heatsink fin module 40 is sandwiched between the first molded frame 31 and the second molded frame 32. Each of the two first connecting portions 311 of the first molded frame 31 is mounted on the heatsink fin module 40. Each of the two second connecting portions 321 of the second molded frame 32 is mounted on each of the two first connecting portions 311 of the first molded frame 31. The second abutting section 3211 of each of the two second connecting portions 321 rests on and presses the first abutting section 3111 of each of the two first connecting portions 311. The two first connecting portions 311 and the two second connecting portions 321 construct a pressing portion to reinforce and secure the first molded frame 31 and the second molded frame 32, and to press and seal the heatsink tube 50.

In the preferred embodiment of the present invention, each of the first molded frame 31 and the second molded frame 32 has a U-shaped configuration.

In the preferred embodiment of the present invention, the heatsink tube 50 has two parallel sides forming two opposite pressing edges each of which is formed by the first abutting section 3111 of each of the two first connecting portions 311 and the second abutting section 3211 of each of the two second connecting portions 321.

In the preferred embodiment of the present invention, the first molded frame 31 and the second molded frame 32 are produced by roll pressing.

In the preferred embodiment of the present invention, the bottom of each of the two first connecting portions 311 and the first end faceplate 310 have a connection which is bent inward to form the first abutting section 3111, and each of the two second connecting portions 321 has an upper edge which is pressed and bent inward to form the second abutting section 3211.

In the preferred embodiment of the present invention, the first abutting section 3111 of each of the two first connecting portions 311 has a stepped shape.

In the preferred embodiment of the present invention, the flux is applied on an inner face of the first end faceplate 310 and the two first connecting portions 311 of the first molded frame 31 and an inner face of the second end faceplate 320 and the two second connecting portions 321 of the second molded frame 32.

In the preferred embodiment of the present invention, the heatsink fin module 40 is encompassed by the first end faceplate 310 and the two first connecting portions 311 of the first molded frame 31, and the second end faceplate 320 of the second molded frame 32.

In the preferred embodiment of the present invention, each of the two second connecting portions 321 of the second molded frame 32 is located outside of and rests on each of the two first connecting portions 311 of the first molded frame 31.

Figure 4:
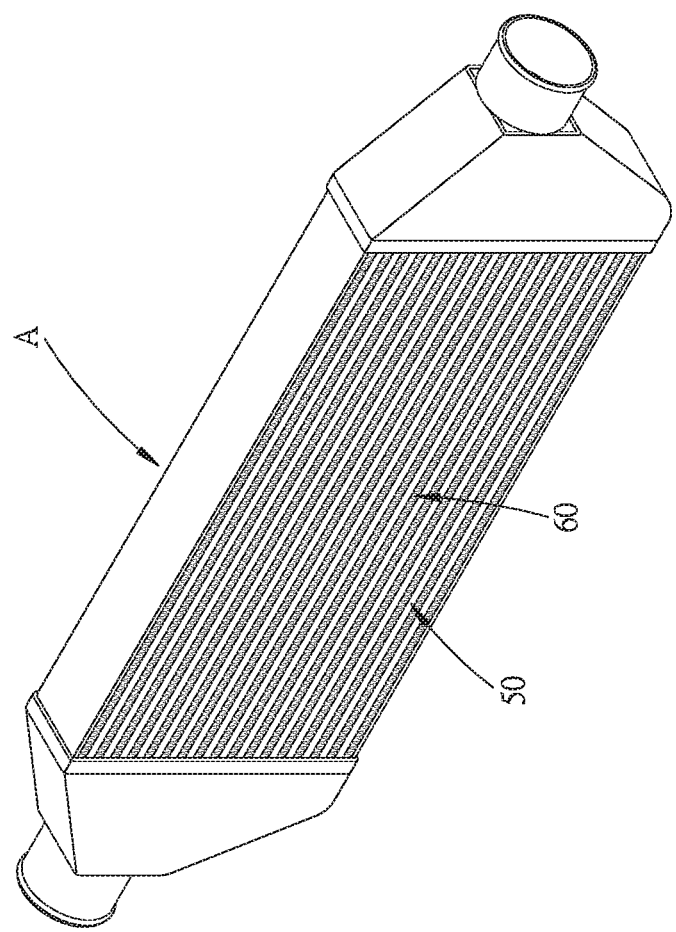
FIG. 4 is a perspective view of the heatsink tube for an intercooler in accordance with the preferred embodiment of the present invention.

Referring to FIG. 4, the heatsink tube 50 is mounted on an intercooler A and connected with an outer fin 60 of the intercooler A. The outer fin 60 of the intercooler A is combined with the heatsink tube 50 by brazing (or soldering). In such a manner, the first end faceplate 310 of the first molded frame 31 and the second end faceplate 320 of the second molded frame 32 are connected with the outer fin 60. The heatsink tube 50 and the outer fin 60 of the intercooler A are combined securely and completely during the brazing process by provision of the flux. At this time, the heatsink fin module 40 is connected with the first end faceplate 310 of the first molded frame 31 and the second end faceplate 320 of the second molded frame 32 by brazing. Each of the two first connecting portions 311 is connected with each of the two second connecting portions 321 by brazing, to increase the thickness of the heatsink tube 50.

In conclusion, the flux is applied evenly on the first end faceplate 310 and the two first connecting portions 311 of the first molded frame 31, and the second end faceplate 320 and the two second connecting portions 321 of the second molded frame 32. The heatsink fin module 40 is placed into the first molded frame 31 and the second molded frame 32 easily and quickly. The second abutting section 3211 of each of the two second connecting portions 321 rests on and presses the first abutting section 3111 of each of the two first connecting portions 311. Thus, the first molded frame 31 and the second molded frame 32 are combined with the heatsink fin module 40 closely and will not break the heatsink fin module 40. The first end faceplate 310 of the first molded frame 31 and the second end faceplate 320 of the second molded frame 32 touch the outer fin 60, to increase the contact area, so as to enhance the heat dissipation effect. Each of the two first connecting portions 311 of the first molded frame 31 and each of the two second connecting portions 321 of the second molded frame 32 are connected to increase the side strength of the heatsink tube 50 so that the heatsink tube 50 is not broken easily, to enhance the lifetime of the heatsink tube 50. The heatsink fin module 40 is encompassed by the first end faceplate 310 and the two first connecting portions 311 of the first molded frame 31, and the second end faceplate 320 of the second molded frame 32, to increase the contact area, so as to enhance the heat dissipation effect.

Accordingly, the heatsink fin module 40 is assembled with the first molded frame 31 and the second molded frame 32 easily and quickly and will not be compressed and deformed, to increase the production quality of the heatsink tube 50. In addition, the heatsink tube 50 is produced quickly and is assembled easily and conveniently. Further, the heatsink tube 50 has a high quality, has a low cost, and has a long lifetime.

Figure 5:
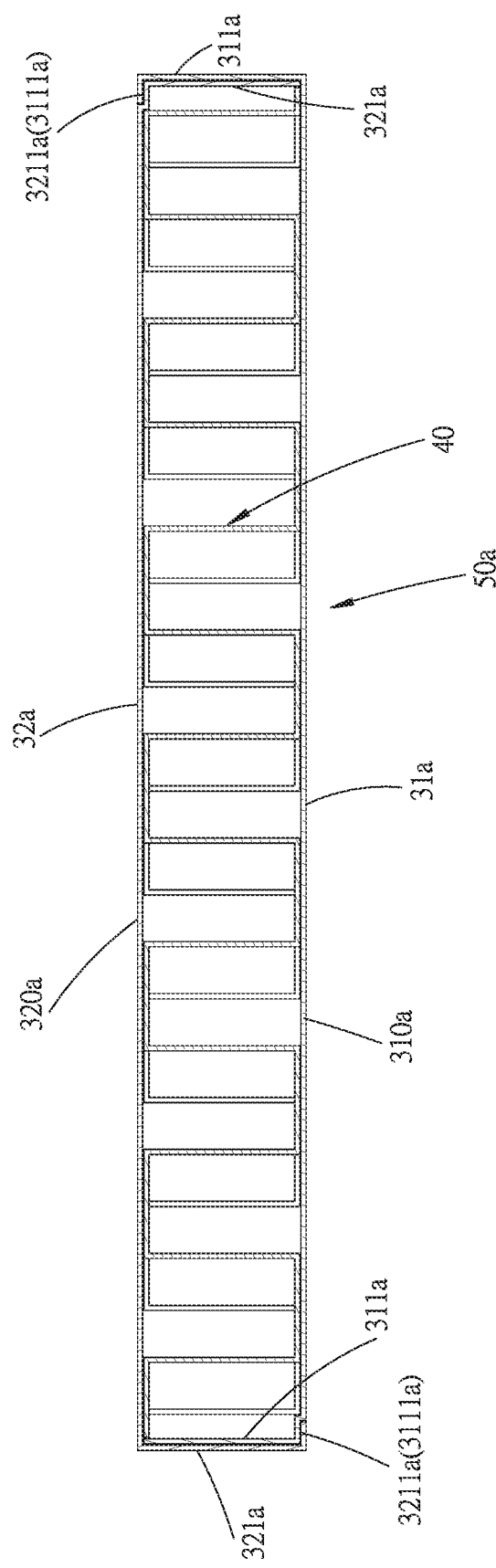
FIG. 5 is a locally enlarged cross-sectional assembly view of the heatsink tube in accordance with another preferred embodiment of the present invention.
Figure 6:
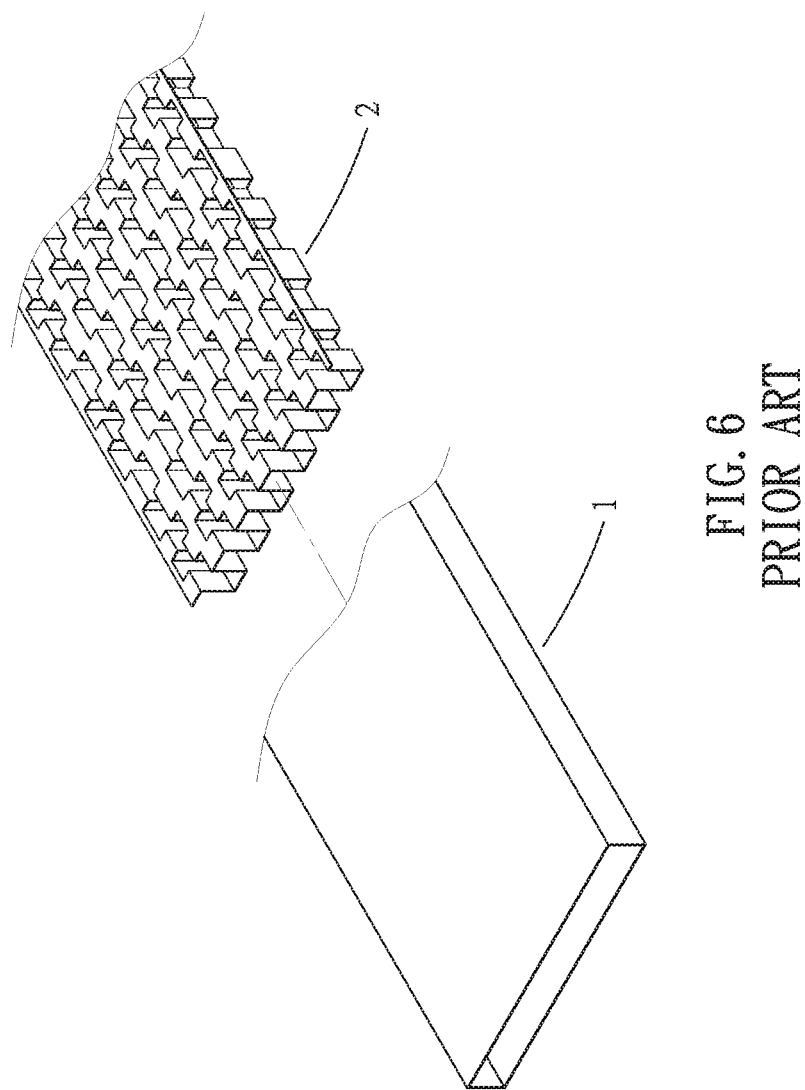
FIG. 6 is an exploded perspective view of a conventional heatsink tube in accordance with the prior art.
Figure 7:
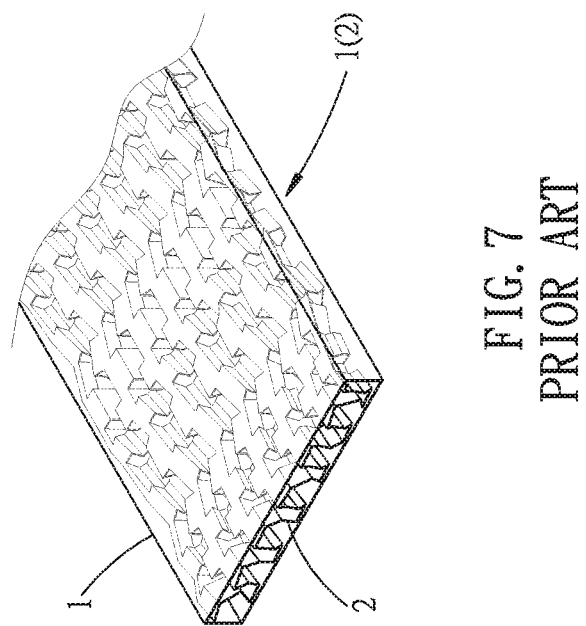
FIG. 7 is a perspective assembly view of the conventional heatsink tube in accordance with the prior art.
Figure 8:
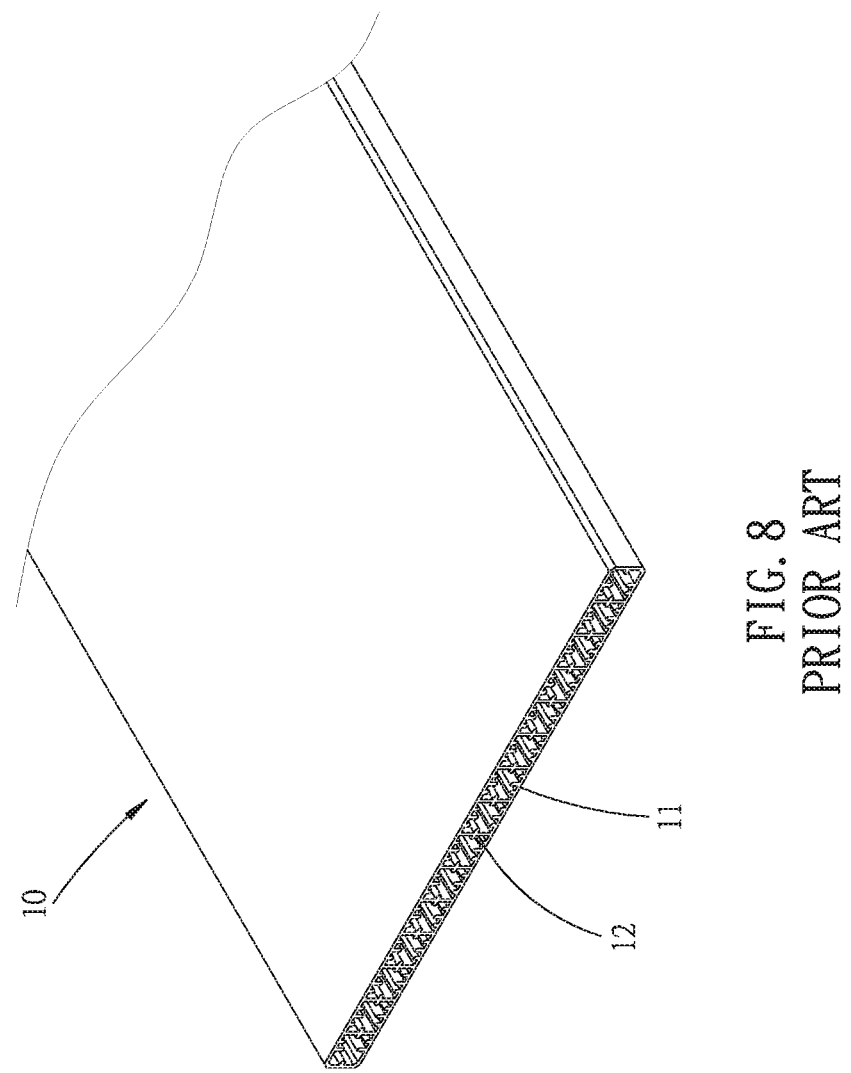
FIG. 8 is a perspective view of another conventional heatsink tube in accordance with the prior art.

Referring to FIG. 5, the heatsink tube 50a has two diagonal corners forming two opposite pressing edges each of which is formed by the first abutting section 3111a of each of the two first connecting portions 311a and the second abutting section 3211a of each of the two second connecting portions 321a. In practice, the bottom of one of the two first connecting portions 311a and the first end faceplate 310a of the first molded frame 31a have a connection which is bent inward to form the first abutting section 3111a, and the top of one of the two first connecting portions 311a is pressed and bent inward to form the first abutting section 3111a. In addition, the bottom of one of the two second connecting portions 321a is pressed and bent inward to form the second abutting section 3211a, and the top of one of the two second connecting portions 321a and the second end faceplate 320a of the second molded frame 32a have a connection which is bent inward to form the second abutting section 3211a.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A method for forming a heatsink tube comprising:
a first step, a second step, and a third step;
wherein:
the first step includes performing a tube folding to initially roll a base sheet plate and then cut the base sheet plate into a first molded frame and a second molded frame;
the base sheet plate is made of aluminum;
the first molded frame is formed with a first end faceplate and two first connecting portions;
the two first connecting portions are formed on two sides of the first end faceplate;
each of the two first connecting portions is formed with a first abutting section;
the second molded frame is formed with a second end faceplate and two second connecting portions;
the two second connecting portions are formed on two sides of the second end faceplate;
each of the two second connecting portions is formed with a second abutting section;
the second abutting section of each of the two second connecting portions corresponds to the first abutting section of each of the two first connecting portions;
the second step includes applying a flux on an inner face of the first molded frame and the second molded frame;
the third step includes mounting the first molded frame on a heatsink fin module with the heatsink fin module being inserted into the first molded frame, and mounting the second molded frame on the first molded frame, to assemble the first molded frame, the heatsink fin module, and the second molded frame, and to form a product of a heatsink tube;
the heatsink fin module is flexible;
the heatsink tube has a flat shape;
the first molded frame, the heatsink fin module, and the second molded frame are combined to construct the heatsink tube;
the heatsink fin module is sandwiched between the first molded frame and the second molded frame;
each of the two first connecting portions of the first molded frame is mounted on the heatsink fin module;
each of the two second connecting portions of the second molded frame is mounted on each of the two first connecting portions of the first molded frame; and
the second abutting section of each of the two second connecting portions rests on and presses the first abutting section of each of the two first connecting portions.

2. The method as claimed in claim 1, wherein each of the first molded frame and the second molded frame has a U-shaped configuration.

3. The method as claimed in claim 1, wherein the heatsink tube has two parallel sides forming two opposite pressing edges each of which is pressed by the first abutting section of each of the two first connecting portions and the second abutting section of each of the two second connecting portions.

4. The method as claimed in claim 1, wherein the heatsink tube has two diagonal corners forming two opposite pressing edges each of which is pressed by the first abutting section of each of the two first connecting portions and the second abutting section of each of the two second connecting portions.

5. The method as claimed in claim 1, wherein the third step of mounting the first molded frame on a heatsink fin module further includes:
fully fitting the heatsink fin module in the first molded frame.

6. The method as claimed in claim 1, wherein the third step of mounting the first molded frame on a heatsink fin module further includes:
fully fitting the heatsink fin module in the first molded frame, with two sides of the heatsink fin module resting on and covered by the two first connecting portions of the first molded frame.

7. The method as claimed in claim 1, wherein the first step further includes:
disposing each of the two first connecting portions of the first molded frame at an upright flat state.

8. The method as claimed in claim 1, wherein the first step further includes:
disposing each of the two second connecting portions of the second molded frame at an upright flat state.

9. The method as claimed in claim 1, wherein the first abutting section and each of the two first connecting portions of the first molded frame form an L-shaped configuration.

10. The method as claimed in claim 1, wherein the second abutting section and each of the two second connecting portions of the second molded frame form an L-shaped configuration.

11. The method as claimed in claim 1, wherein each of the two first connecting portions of the first molded frame has a height equal to a thickness of the heatsink fin module.

12. The method as claimed in claim 1, wherein each of the two second connecting portions of the second molded frame has a height equal to a thickness of the heatsink fin module.

13. The method as claimed in claim 1, wherein the heatsink fin module has a flat shape.

14. The method as claimed in claim 1, wherein the third step of mounting the second molded frame on the first molded frame further includes:
closely fitting the second molded frame onto the first molded frame.

* * * * *